(12) United States Patent
Hong

(10) Patent No.: US 8,208,042 B2
(45) Date of Patent: Jun. 26, 2012

(54) METHOD OF CONTROLLING DIGITAL PHOTOGRAPHING APPARATUS, DIGITAL PHOTOGRAPHING APPARATUS, AND MEDIUM HAVING RECORDED THEREON A PROGRAM FOR EXECUTING THE METHOD

(75) Inventor: Min-suk Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 12/533,206

(22) Filed: Jul. 31, 2009

(65) Prior Publication Data

US 2010/0026834 A1 Feb. 4, 2010

(30) Foreign Application Priority Data

Aug. 1, 2008 (KR) ........................ 10-2008-0075578

(51) Int. Cl.
*H04N 5/262* (2006.01)
(52) U.S. Cl. ..................................... 348/239; 348/222.1
(58) Field of Classification Search ............... 348/239
See application file for complete search history.

(56) References Cited

U.S. PATENT DOCUMENTS

| 2006/0078173 | A1* | 4/2006 | Isomura et al. | 382/118 |
| 2006/0197851 | A1* | 9/2006 | Vlahos | 348/239 |
| 2009/0175609 | A1* | 7/2009 | Tan | 396/77 |
| 2010/0321534 | A1* | 12/2010 | Kim | 348/239 |
| 2011/0074977 | A1* | 3/2011 | Yamaji | 348/239 |
| 2012/0005595 | A1* | 1/2012 | Gavade et al. | 715/751 |

* cited by examiner

*Primary Examiner* — Sinh Tran
*Assistant Examiner* — Shahbaz Nazrul
(74) *Attorney, Agent, or Firm* — Drinker Biddle & Reath LLP

(57) ABSTRACT

A method of controlling a digital photographing apparatus is provided. Also provided is a digital photographing apparatus using the method and a computer readable recording medium having recorded thereon a computer program for executing the method. The method includes displaying a residual image of a background image; setting a partial area of an area on which the residual image is displayed; capturing an image including a subject; extracting a subject image corresponding to the partial area from the image; and generating a composite image by combining the background image and the subject image.

12 Claims, 6 Drawing Sheets

METHOD OF CONTROLLING DIGITAL PHOTOGRAPHING APPARATUS, DIGITAL PHOTOGRAPHING APPARATUS, AND MEDIUM HAVING RECORDED THEREON A PROGRAM FOR EXECUTING THE METHOD

CROSS-REFERENCE TO RELATED PATENT APPLICATION

This application claims the benefit of Korean Patent Application No. 10-2008-0075578, filed on Aug. 1, 2008 in the Korean Intellectual Property Office, the entire contents of which is incorporated herein by reference.

BACKGROUND OF THE INVENTION

1. Field of the Invention

The present invention relates to a method of controlling a digital photographing apparatus, a digital photographing apparatus using the method, and a computer readable recording medium having recorded thereon a computer program for executing the method. More particularly, the present invention relates to a method of controlling a digital photographing apparatus which facilitates the photographing of a background and a subject together, a digital photographing apparatus using the method, and a computer readable recording medium having recorded thereon a computer program for executing the method.

2. Description of the Related Art

A problem that exists with a conventional digital photographing apparatus is that when a background object, such as a building, is photographed together with a person, either the person must be made very small in order to include the whole background object or the whole background object cannot be included in order to show the person large enough at a reasonable size. In other words, an image in which a whole background object is included together with a person who is far smaller than the background object so that the image shows the whole background object together with the person in a manner in which the person is shown in the image at a size large enough to be identified cannot be captured by using the conventional digital photographing apparatus.

SUMMARY OF THE INVENTION

The present invention provides a method of controlling a digital photographing apparatus which captures an image so as to include a whole background object, such as a large building, and to also show a subject at a desired position and size together with the whole background object. Also provided are a digital photographing apparatus using the method, and a computer readable recording medium having recorded thereon a computer program for executing the method.

According to an embodiment of the present invention, a method of controlling a digital photographing apparatus is provided. The method includes displaying a residual image of a background image; setting a partial area of an area on which the residual image is displayed; capturing an image including a subject; extracting a subject image corresponding to the partial area, from the image; and generating a composite image by combining the background image and the subject image.

The method may further include recognizing the subject. If the subject is a person, the subject may be recognized by using outline information of the person, based on face recognition.

The extracting of the subject image corresponding to the partial area may include extracting the subject image which is separated along an outline of the subject, from the partial area.

The method may further include displaying the subject on the partial area.

The method may further include capturing the background image; storing the background image; and selecting a live-view mode.

The residual image of the background image may be obtained by blurring the background image or reducing transparency.

The method may include determining whether a capture signal is input; if the capture signal is input, capturing the image including the subject; and, if the capture signal is not input, changing the partial area or the background image.

The method may further include storing the composite image.

According to another embodiment of the present invention, a computer readable recording medium is also provided. The computer readable recording medium has recorded thereon a computer program for executing the method of controlling a digital photographing apparatus.

According to another embodiment of the present invention, a digital photographing apparatus is provided. The digital photographing apparatus includes a residual image generator generating a residual image of a background image; an area setter setting a partial area of an area on which the residual image is displayed; a subject image extractor extracting a subject image corresponding to the partial area from an image including a subject; and a compositor generating a composite image by combining the background image and the subject image.

The residual image generator may generate the residual image by blurring the background image or reducing transparency.

The digital photographing apparatus may further include a subject recognizer recognizing the subject.

If the subject is a person, the subject recognizer may recognize the subject by using outline information of the person, based on face recognition.

The digital photographing apparatus may further include an image signal processor generating the background image or the image including the subject.

The subject image extractor may extract the subject image which is separated along an outline of the subject, from the partial area.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings.

Figure 1:
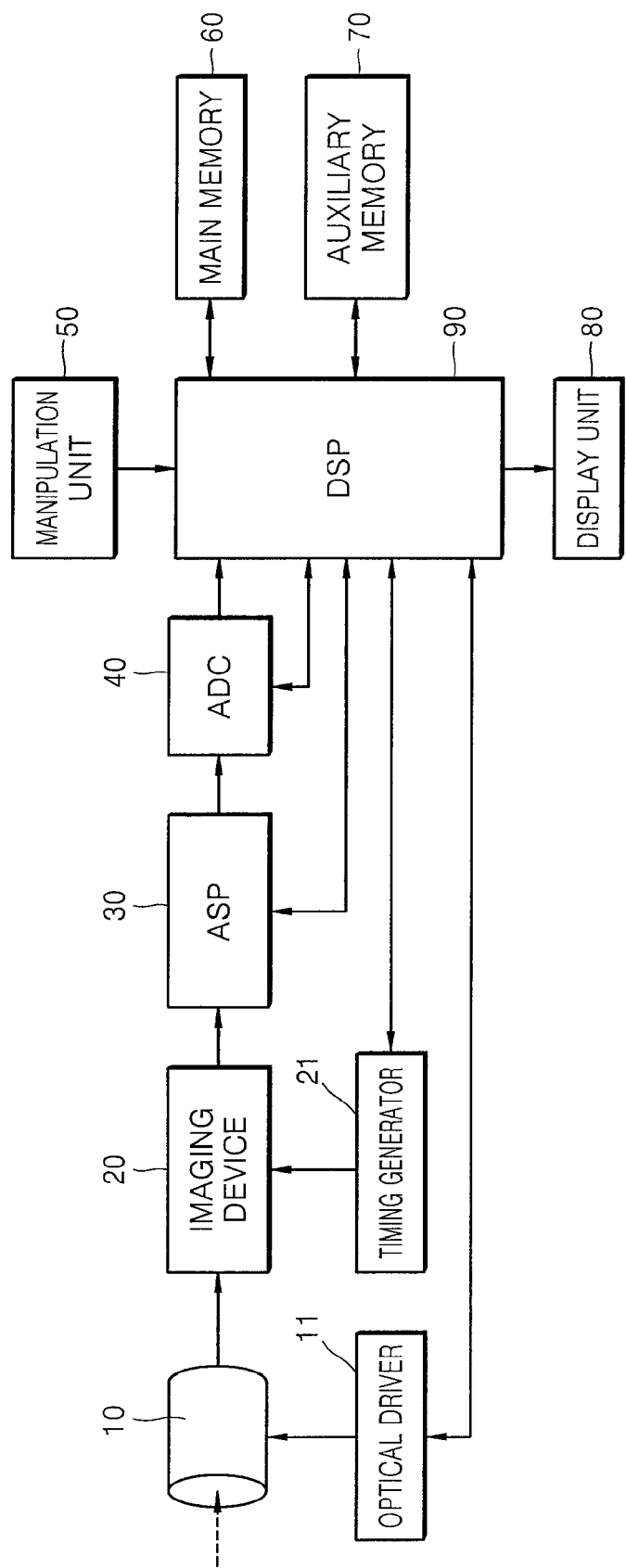
FIG. 1 is a block diagram of an example of a digital photographing apparatus according to an embodiment of the present invention.

FIG. 1 is a block diagram of an example of a digital photographing apparatus according to an embodiment of the present invention.

Referring to the example of FIG. 1, the digital photographing apparatus according to the current embodiment of the present invention may include an optical unit 10 transmitting an optical signal, an imaging device 20 imaging a subject by inputting the optical signal that passes through the optical unit 10 so as to generate an image signal, an analog signal processor (ASP) 30 processing the image signal that is an analog signal, an analog-to-digital converter (ADC) 40 converting the image signal into a digital signal, a manipulation unit 50 for inputting an external manipulation signal of the digital photographing apparatus, a main memory 60 storing the image signal and a program, an auxiliary memory 70 storing image files, a display unit 80 displaying the image signal and an operation state of the digital photographing apparatus, and a digital signal processor (DSP) 90 controlling general operation of the digital photographing apparatus. In this example, the auxiliary memory 70 is detachable from the DSP 90.

More particularly, the optical unit 10 transmits the optical signal from the subject to the imaging device 20. The optical unit 10 may include, for example, a lens condensing the optical signal, an aperture controlling an amount of light on the optical signal, and a shutter controlling an input of the optical signal. Also, the lens may include, for example, a zoom lens controlling a viewing angle to be narrow or wide according to a focal length, and a focus lens focusing the subject. Each of the zoom lens and the focus lens may be formed of, for example, a single lens or a group of lenses.

The optical unit 10 may be driven by an optical driver 11. For example, the optical driver 11 controls a position of the lens, an opening of the aperture, and an operation of the shutter. The subject may be brought in focus by changing the position of the lens. Also, the amount of light for exposure may be controlled by controlling the opening of the aperture or the shutter. The optical driver 11 may receive real-time-input image information or user input information from the DSP 90 so as to drive the optical unit 10 based on the information.

The optical signal that passes through the optical unit 10 reaches a light receiving surface of the imaging device 20 so as to form the image of the subject. A charge coupled device (CCD) or a complementary metal oxide semiconductor image sensor (CIS), for example, which converts an optical signal into an electrical signal may be used as the imaging device 20. A timing generator 21 may control time for accumulating charges and time for outputting the accumulated charges, of the imaging device 20 so as to control speed. The timing generator 21 may control operation of the imaging device 20 according to image signal processing of the DSP 90.

The ASP 30 performs, for example, correlated double sampling (CDS) on the image signal that is provided from the imaging device 20 and is an analog signal, by sampling and holding the image signal, so as to remove high frequency noise components. In this example, a corresponding gain is automatically applied to the image signal on which the CDS is performed, so as to control amplitude. In this case, the gain is applied in order to approximate a value obtained by integrating the image signal that is converted into a digital signal by the DSP 90, to a reference value. That is, in this example, the gain is automatically adjusted by a feedback signal from the DSP 90.

The image signal processed by the ASP 30 is output to the ADC 40. The ADC 40 converts the image signal that is an analog signal, into a digital signal so as to output the image signal to the DSP 90.

The manipulation unit 50 includes various function buttons such as, for example, wide-angle and telephoto zoom buttons for making the viewing angle large or small according to an input, text input buttons, a mode selection button for selecting a live-view mode or a reproduction mode, and setting buttons for setting speed, white balance, and exposure. The manipulation unit 50 may be implemented in any form such as a keyboard, a touch pad, a touch screen, or a remote controller, for example, through which the user may input signals.

The main memory 60 transmits data to the DSP 90 and a central processing unit (CPU) of the DSP 90. For example, the main memory 60 may temporarily store the image signal provided by the ADC 40, the image signal processed by the DSP 90, and image data restored from an image file. In this case, dynamic random access memory (DRAM) may be used. Also, a manufacturer may store the program for executing operation of the digital photographing apparatus, or various types of information, in the main memory 60. In this example, a read-only memory (ROM) may be used.

The auxiliary memory 70 may store user-desired information such as captured image files. Flash memory may be used as the auxiliary memory 70 in this example.

The display unit 80 may display the operation state of the digital photographing apparatus, a captured image, or an image restored from a stored image file. A liquid crystal display (LCD) device, an organic light-emitting diode (OLED) device, or an electrophoretic display (EDD) device, for example, may be used as the display unit 80.

The DSP 90 will now be described in detail with reference to FIG. 2.

Figure 2:
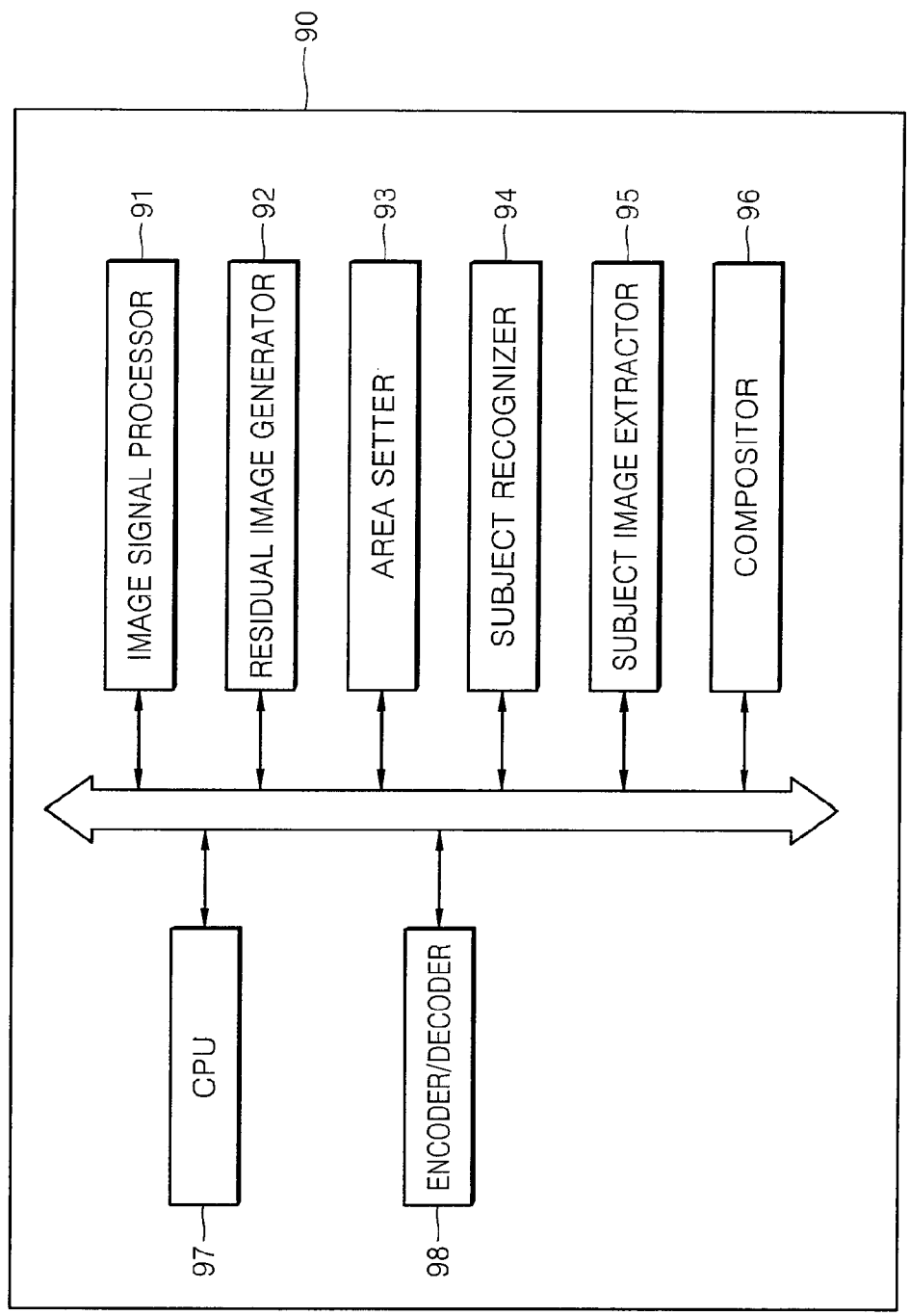
FIG. 2 is a block diagram of an example of a digital signal processor (DSP) of the digital photographing apparatus illustrated in FIG. 1.

FIG. 2 is a block diagram of an example of the DSP 90 of the digital photographing apparatus illustrated in FIG. 1. FIG. 2 will be described in conjunction with FIG. 1.

Referring to the example of FIG. 2, the DSP 90 includes an image signal processor 91 processing real-time-input image data. The image signal processor 91 may not only reduce noise of an image signal that is converted into a digital signal, but also may perform gamma correction, color filter array interpolation, color correction, and color enhancement, for example, on the image signal.

Also, the DSP 90 in this example includes a residual image generator 92 generating a residual image of a background image. The residual image generator 92 generates the residual image by performing image processing on the background image, for example, by blurring the background image or reducing transparency and temporarily stores the residual image in the main memory 60 so that the residual image is displayed on a screen of the display unit 80 in a live-view mode. Also, a real-time-input image may be displayed together with the residual image in this example.

An area setter 93 may set a partial area from the screen on which the residual image is displayed. The partial area set by the area setter 93 may be selected by the manipulation unit 50 according to a selection signal of a user. In the live-view mode, only a portion of the real-time-input image which corresponds to the partial area may be displayed while the residual image is being displayed.

A subject recognizer 94 recognizes a subject from the real-time-input image. If the subject is a person, the subject may be recognized by deriving an outline of upper and lower bodies under a face that is recognized based on face recognition. The subject may be recognized by using color information as well as outline information. The user may control the subject to be disposed on the partial area and may also control a size of the subject in consideration of a size of a background and a size of the partial area.

When a capture signal is input, an image including the subject is captured. Then, a subject image is extracted from the image. The extracting of the subject image may be performed by a subject image extractor 95.

A compositor 96 generates a composite image by combining the background image and the subject image. For example, the compositor 96 may generate the composite image by including only image data of the background image on the remaining area that is not the partial area, and including only image data of the subject image on the partial area. More particularly, a weight of the background image may be set as a value 1 and a weight of the subject image may be set as a value 0 on the remaining area, or alternatively the weight of the subject image may be set as the value 1 and the weight of the background image may be set as the value 0 on the partial area.

Also, the DSP 90 may include a CPU 97 controlling general operation of the digital photographing apparatus, and an encoder/decoder 98 generating an image file by compressing the composite image or restoring a composite image from the image file.

Figure 3:
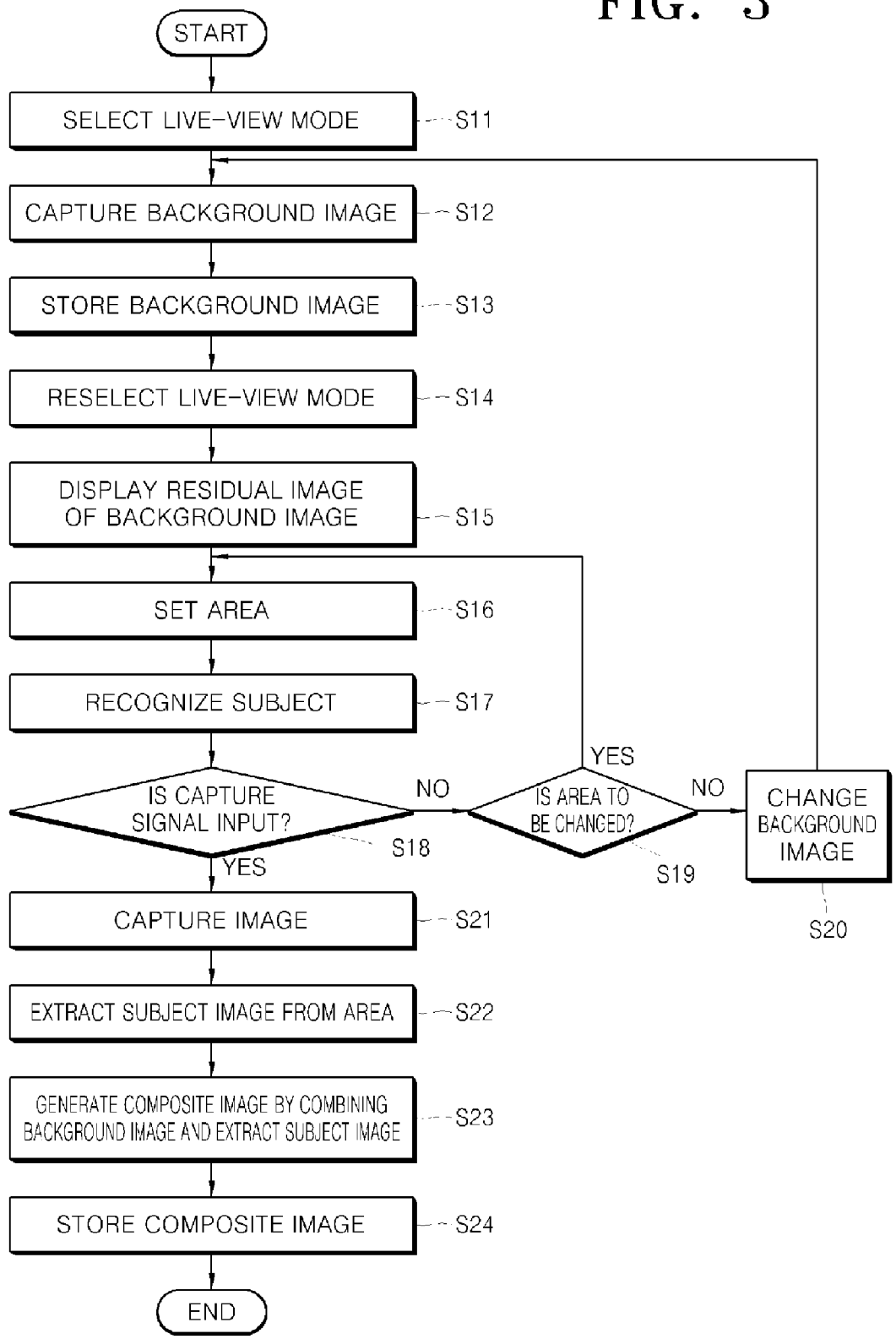
FIG. 3 is a flowchart of an example of a method of controlling a digital photographing apparatus, according to an embodiment of the present invention.

FIG. 3 is a flowchart of an example of a method of controlling a digital photographing apparatus, according to an embodiment of the present invention.

Referring to FIG. 3, initially, a live-view mode is selected in operation S11.

Then, a background image is captured in operation S12. For example, the background image may be captured so as to include a whole desired background.

The background image is stored in operation S13.

The live-view mode is reselected in operation S14.

A residual image of the background image is generated and the residual image is displayed in the live-view mode in operation S15. The residual image may be generated by performing image processing on the background image, for example, by blurring the background image or reducing transparency. For example, the residual image may be generated by setting a weight of the background image as a value less than 1.

According to the current embodiment of the present invention, the background image is captured and stored, and then the residual image is generated from the background image. However, the present invention is not limited to such an arrangement. The residual image may be generated by performing image processing on the background image, for example, by blurring an image restored from an image file that is already formed, and displayed on the display unit 80, or reducing transparency.

A partial area of a screen on which the residual image is displayed is set in operation S16. The partial area may be set according to selection of a user. In this case, while the residual image of the background image is being displayed, the user may determine a position and size of a subject so as to match well with the background image. While the residual image is being displayed, the partial area of the residual image, on which a subject image is to be combined, may be determined.

The partial area may be determined by, for example, a manipulation unit, based on a selection signal of the user.

While the subject image is being input in real time in the live-view mode, the subject is recognized in operation S17. The subject may be recognized, for example, by deriving an outline of upper and lower bodies under a face that is recognized based on face recognition. The outline may be derived, for example, by performing edge analysis on the image. Alternatively, the subject may be recognized by using color information of the image. If the subject is recognized, a mark representing the subject may be additionally displayed. For example, if the subject is a person, a mark may be displayed along an outline of the person.

In operation S18, a determination is made of whether a capture signal is input. If the capture signal is not input, a determination is made of whether to change the partial area, in operation S19. If the partial area is to be changed, the method returns to operation S16 and resets the partial area. If the partial area is not to be changed, the background image is changed in operation S20. Thus, the method returns to operation S12 and recaptures the background image.

If the capture signal is input, an image including the subject is captured in operation S21.

Then, the subject image is extracted from the image in operation S22. For example, only an image in the outline or an image in the partial area may be extracted. The subject image may be extracted by setting a weight of the image in the outline or the image in the partial area, as a value 1, and setting a weight of a remaining area as a value 0.

Then, the background image and the subject image are combined so as to generate a composite image, in operation S23.

The composite image may be compressed and stored in operation S24.

As described above, an image including a background and a subject which match well, may be obtained by generating a residual image of a background image, displaying the residual image in a live-view mode, and controlling a position and size of the subject so as to match well with the background image.

Figure 4:
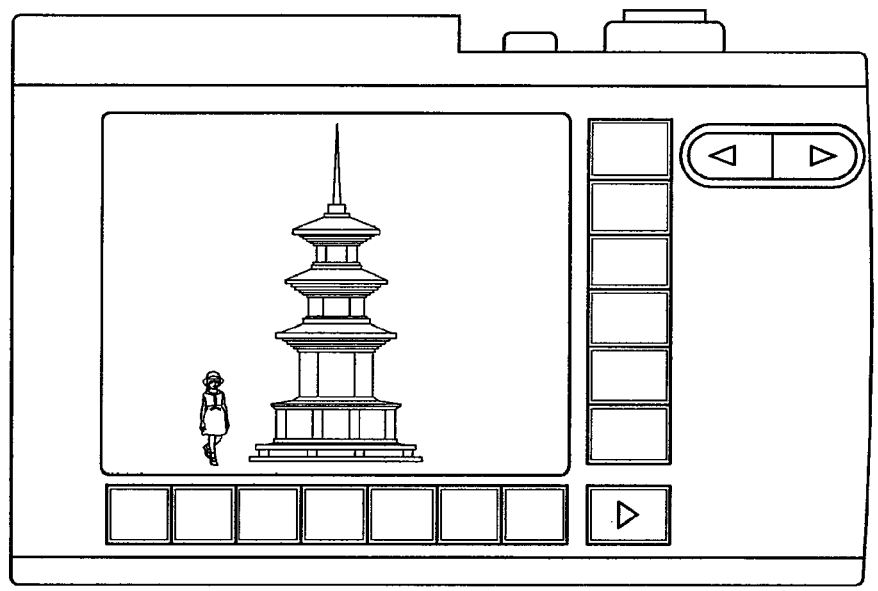
FIG. 4 is a schematic view showing an example of a screen of a digital photographing apparatus using a conventional method of controlling the digital photographing apparatus.
Figure 5:
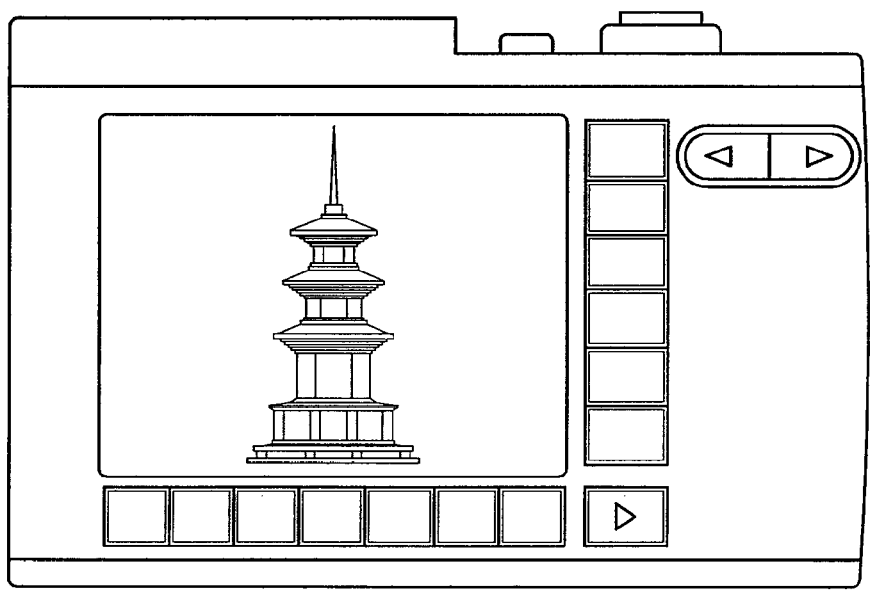
FIGS. 5 through 8 are schematic views showing examples of a screen of a digital photographing apparatus using the method illustrated in FIG. 3, according to an embodiment of the present invention.

FIG. 4 is a schematic view showing an example of a screen of a digital photographing apparatus using a conventional method of controlling the digital photographing apparatus. FIGS. 5 through 8 are schematic views showing examples of a screen of a digital photographing apparatus using the method illustrated in FIG. 3, according to an embodiment of the present invention.

The screen of the example of FIG. 4 shows an image obtained by capturing a tower and a person using the conventional method. The tower is far larger than the person. As a result, in order to obtain an image including the whole tower, the person is shown in the image in a very small size, thus being unidentifiable.

Figure 6:
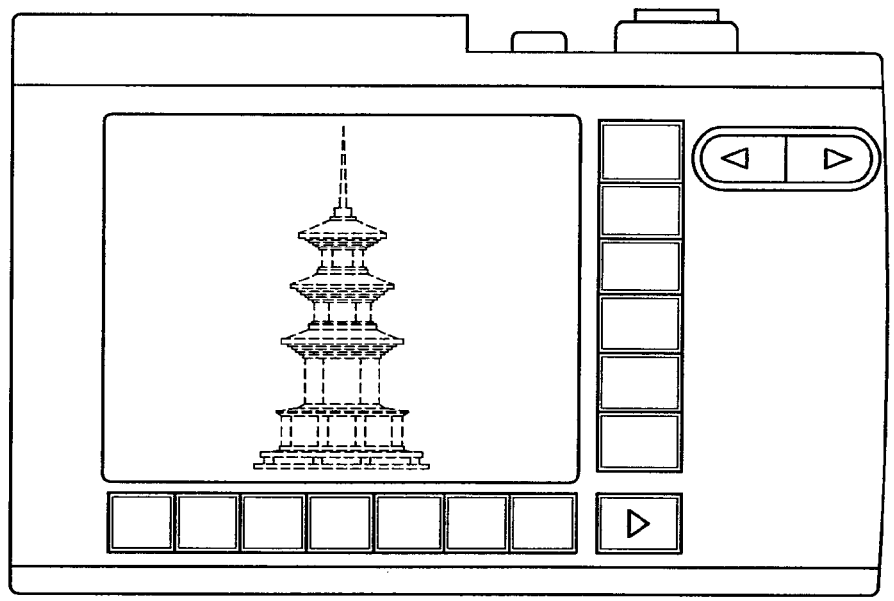
Figure 7:
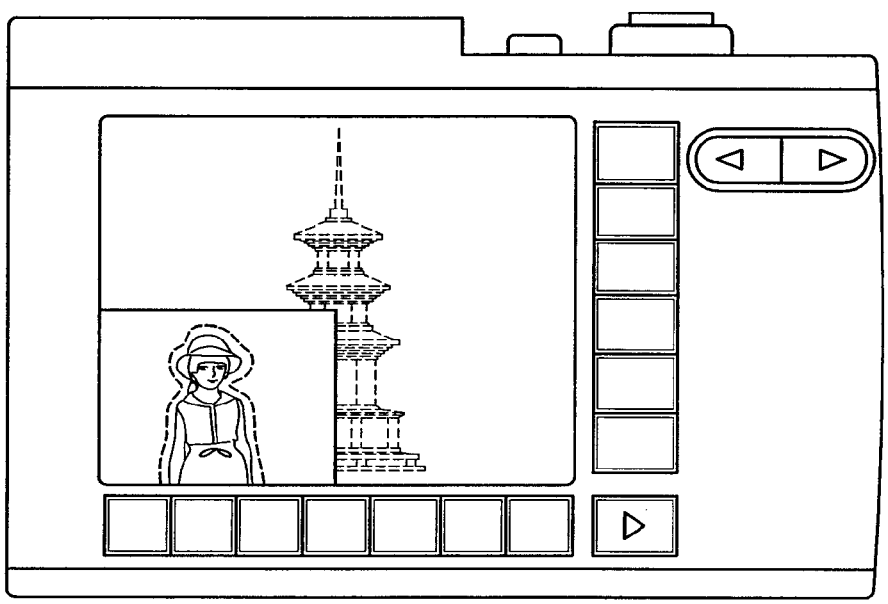

However, using the method illustrated in the example of FIG. 3 according to the present invention, an image may be obtained in which both the whole tower and the person is included with the person having a size large enough to be identified. More particularly, referring to the example of FIG. 5, a first image including the tower is captured and stored as a background image. A residual image of the first image is generated and displayed on the screen as illustrated in the example of FIG. 6. Referring to the example of FIG. 7, a partial area is selected from the screen on which the residual image is displayed. According to the current embodiment of the present invention, a portion on a left bottom portion of the screen, which is marked by a solid line, for example, is selected as the partial area. An image that is currently input in real time, may be displayed on the partial area, and the residual image may be displayed on a remaining area. Also, the image that is currently input in real time, may be displayed while the residual image is being displayed.

Figure 8:
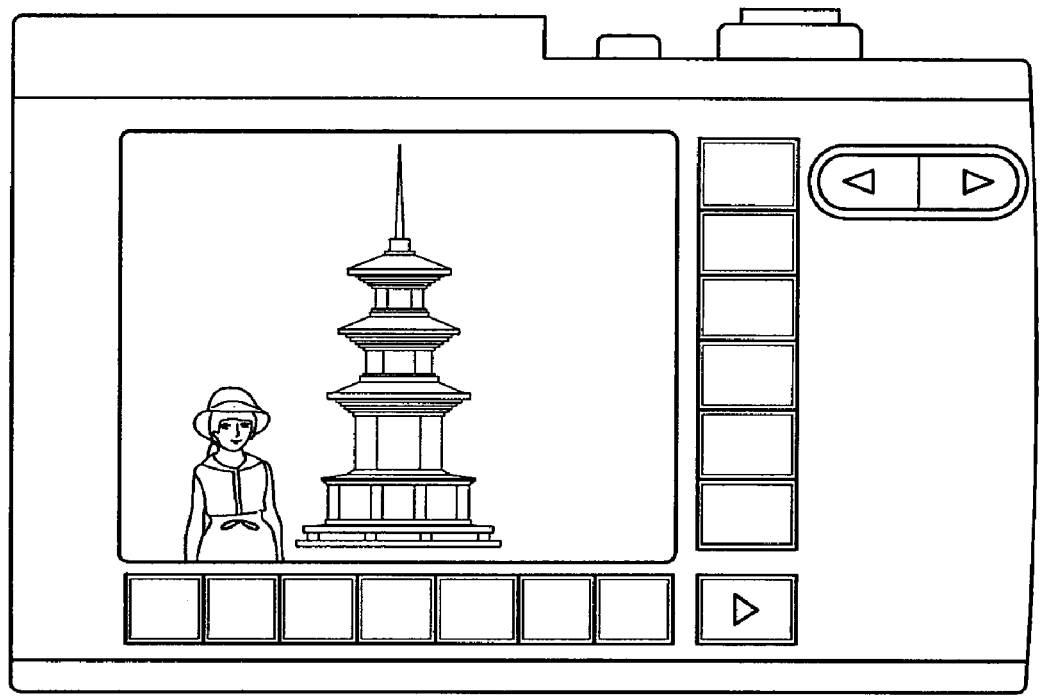

Then, a mark representing the partial area may be displayed. According to the current embodiment of the present invention, the image that is currently input in real time, is displayed on the partial area and the residual image is displayed on the remaining area in a live-view mode, for example. Then, if a subject is displayed on the partial area, the subject is recognized. If the subject is a person, as is described according to the current embodiment of the present invention, the subject may be recognized by deriving an outline of the subject based on face recognition. After an image of the recognized subject is extracted as the subject image, a composite image may be generated by combining the subject image and the background image. Thus, the composite image may be stored and displayed as illustrated in the example of FIG. 8. Accordingly, a user-desired image may be obtained in which the whole tower is included and is shown together with the subject which has a size large enough to be identified.

The present invention includes a computer readable recording medium on which one or more operations including an operation of generating and displaying a residual image, from among the above-described operations, are embodied as computer readable codes so as to be recorded. For example, a computer readable recording medium having recorded thereon a computer program for executing the method of controlling a digital photographing apparatus of the instant application's disclosure is provided. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the present invention, a user-desired image may be generated by displaying a residual image of a background image in a live-view mode and capturing an image of a subject that matches well with the residual image. An image may be obtained in which a whole background object, such as a large building, is included together with a subject and also in which a position and size of a subject are controlled so as to match well with the background object.

While the present invention has been particularly shown and described with reference to exemplary embodiments thereof, it will be understood by those of ordinary skill in the art that various changes in form and details may be made therein without departing from the spirit and scope of the present invention as defined by the appended claims.

What is claimed is:

1. A method of controlling a digital photographing apparatus, the method comprising:
   displaying a residual image of a background image;
   setting a partial area of an area on which the residual image is displayed;
   recognizing a subject;
   capturing an image including the subject;
   extracting a subject image disposed on the partial area, from the image; and
   generating a composite image by combining the background image and the subject image,
   wherein, if the subject is a person, the subject is recognized by using outline information of the person, based on face recognition.

2. The method of claim 1, wherein the extracting of the subject image corresponding to the partial area comprises extracting the subject image which is separated along an outline of the subject, from the partial area.

3. The method of claim 1, further comprising displaying the subject on the partial area.

4. The method of claim 1, further comprising:
   capturing the background image;
   storing the background image; and
   selecting a live-view mode.

5. The method of claim 1, wherein the residual image of the background image is obtained by blurring the background image or reducing transparency.

6. The method of claim 1, further comprising:
   determining whether a capture signal is input;
   if the capture signal is input, capturing the image including the subject; and
   if the capture signal is not input, changing the partial area or the background image.

7. The method of claim 1, further comprising storing the composite image.

8. A non-transitory computer readable recording medium having recorded thereon a computer program for executing the method of claim 1.

9. A digital photographing apparatus comprising:
   a residual image generator that generates a residual image of a background image;
   an area setter that sets a partial area of an area on which the residual image is displayed;
   a subject recognizer that recognizes a subject;
   a subject image extractor that extracts a subject image disposed on the partial area from an image including the subject;
   and
   a compositor that generates a composite image by combining the background image and the subject image,
   wherein, if the subject is a person, the subject recognizer recognizes the subject by using outline information of the person, based on face recognition.

10. The digital photographing apparatus of claim 9, wherein the residual image generator generates the residual image by blurring the background image or reducing transparency.

11. The digital photographing apparatus of claim 9, further comprising an image signal processor that generates the background image or the image including the subject.

12. The digital photographing apparatus of claim 9, wherein the subject image extractor extracts the subject image which is separated along an outline of the subject, from the partial area.

* * * * *